United States Patent Office 3,053,906
Patented Sept. 11, 1962

---

3,053,906
PRODUCTION OF ALKALI METAL ALKOXIDES
William H. Schechter, Bradfordwoods, Pa., assignor to Callery Chemical Company, Pittsburgh, Pa., a corporation of Pennsylvania
No Drawing. Filed Dec. 21, 1959, Ser. No. 860,706
10 Claims. (Cl. 260—632)

This invention relates to the production of alkali metal alkoxides and more particularly to a method for their production wherein alkali metal alkyl carbonates are utilized.

The alkali metal alkoxides are sometimes referred to as alkali metal alcoholates and are compounds derived by replacement of the hydrogen atom of the hydroxyl group of an alcohol with an alkali metal. They are used in various applications, such as, for example, as catalysts in condensation, esterification and saponification reactions, as chemical intermediates, and as reducing agents.

Alkali metal alkoxides are generally made by the reaction of an alcohol with an alkali metal. This method, although it has been used extensively, is difficult to control because of the rapid and unpredictable temperature variations which occur because of the exothermic nature of the reaction and because of the hydrogen which is evolved during the reaction. Another method which has been used to produce alkali metal alkoxides is the reaction of an alkali metal hydroxide with an alcohol. This method, however, produces water as a by-product, which is difficult to remove and which tends to decompose the alkoxide produced.

It is one object of this invention to provide a new method for the production of alkali metal alkoxides which is not subject to the foregoing disadvantages.

Another object is to provide a method for the production of alkali metal alkoxides whereby these compounds are produced without the use of an alkali metal or an alkali metal hydroxide.

Still other objects will become apparent from the following specification and claims.

This invention is based upon my discovery that the reaction of an alkaline earth metal oxide with an alkali metal alkyl carbonate produces an alkali metal alkoxide. The reaction follows the general equation

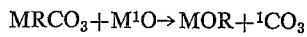

where M is an alkali metal, M¹ is an alkaline earth metal and R is an alkyl group. Using sodium methyl carbonate and barium oxide as examples the reaction proceeds as follows:

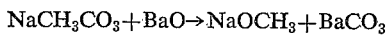

No special conditions of temperature are required in order to carry out the process of my invention. However, the reaction is relatively slow at low temperatures around room temperature (25° C.). It is therefore preferred to use moderate heating in order to speed up the rate of reaction; temperatures between about 50° C. and 150° C. have been generally found to be desirable.

I have found that the reaction is applicable to any alkali metal lower alkyl carbonate, $MRCO_3$, where M is an alkali metal and R is a lower alkyl group. Some of the alkali metal lower alkyl carbonates which are useful in the practice of my invention are lithium methyl carbonate, sodium methyl carbonate, potassium methyl carbonate, lithium ethyl carbonate, sodium ethyl carbonate, potassium ethyl carbonate and sodium isopropyl carbonate. Sodium methyl carbonate, $NaCH_3CO_3$, is the most generally available alkali metal alkyl carbonate and sodium methoxide is generally considered to be the most desirable commercial alkali metal alkoxide, so that at present my invention is most advantageously practiced using sodium methyl carbonate as the carbonate reactant.

Any alkaline earth metal oxide may be reacted with the alkali metal alkyl carbonate in order to produce the alkali metal alkoxide. It will be noted from the equations above that the identity of the alkoxide product does not depend upon the nature of the oxide reactant. I have found, however, that the reaction proceeds more smoothly when barium oxide and calcium oxide are used, so that these are generally the preferred oxide reactants. Barium oxide in particular is preferred because the by-product barium carbonate may be economically utilized. However, oxides of other alkaline earth metals, such as those of magnesium and strontium, can also be used if desired.

I have found it convenient to carry out the reaction in the presence of a solvent in order to promote better contact between the reactants and thus to increase the rate of reaction. One solvent which has been used with success is methanol. The use of a solvent also provides convenient temperature control by carrying out the reaction at the reflux temperature of the solvent, which in the case of methanol is about 65° C. Methanol is additionally advantageous because the by-product carbonates are insoluble and are easily removed.

In one test demonstrating the method and practice of my invention 5 grams of sodium methyl carbonate and 5 grams of barium oxide were placed in 300 milliliters of methanol and heated to the reflux temperature of the methanol for about eight hours. At the end of this time the solution was filtered to remove the by-product barium carbonate and the methanol soluble portion was distilled in order to remove the solvent. The solid remaining after the removal of the methanol was analyzed and found to be sodium methoxide with no sodium methyl carbonate present. The conclusion drawn from the elemental analysis was confirmed by X-ray diffraction comparison with a known sample of sodium methoxide.

According to the provisions of the patent statutes, I have explained the principle and mode of practicing my invention, and have described what I now consider to be its best embodiments. However, I desire to have it understood that within the scope of the appended claims, the invention may be practiced otherwise than as specifically described.

I claim:

1. A method of producing an alkali metal lower alkoxide which comprises reacting an alkali metal lower alkyl carbonate with an alkaline earth metal oxide and recovering the alkali metal lower alkoxide thus formed.

2. A method in accordance with claim 1 in which the alkali metal lower alkyl carbonate is an alkali metal methyl carbonate and the alkali metal lower alkoxide formed is an alkali metal methoxide.

3. A method in accordance with claim 1 in which the reaction is carried out in methanol.

4. A method in accordance with claim 1 in which the reaction is carried out at a temperature between about 50° C. and 150° C.

5. A method in accordance with claim 1 in which the alkaline earth metal oxide is barium oxide.

6. A method in accordance with claim 1 in which the alkaline earth metal oxide is calcium oxide.

7. A method of producing sodium methoxide which comprises reacting sodium methyl carbonate with an alkaline earth metal oxide using methanol as a solvent and recovering the sodium methoxide thus formed.

8. A method in accordance with claim 7 in which the alkaline earth metal oxide is barium oxide.

9. A method of producing lithium methoxide which comprises reacting lithium methyl carbonate with an alkaline earth metal oxide and recovering the lithium methoxide thus formed.

10. A method of producing potassium methoxide which comprises reacting potassium methyl carbonate with an alkaline earth metal oxide and recovering the potassium methoxide thus formed.

References Cited in the file of this patent

UNITED STATES PATENTS

| | | |
|---|---|---|
| 2,278,550 | Loder et al. | Apr. 7, 1942 |
| 2,451,945 | Hanford | Oct. 19, 1948 |

OTHER REFERENCES

Bowden et al.: J. Chem. Soc. (London) 1940, pp. 213–16. (Copy in Library.)